United States Patent
Sannigrahi et al.

(10) Patent No.: US 12,049,576 B2
(45) Date of Patent: Jul. 30, 2024

(54) SILICONE PRESSURE SENSITIVE ADHESIVE AND METHOD OF MAKING THE SAME

(71) Applicant: Momentive Performance Materials Inc., Waterford, NY (US)

(72) Inventors: Arindam Sannigrahi, Bangalore (IN); Sandeep Naik, Maharashtra (IN); Meenal Mehra, New Delhi (IN); Debarshi Dasgupta, Karnataka (IN); Tiberiu Mircea Siclovan, Rexford, NY (US); Kwanho Chang, Clifton Park, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 247 days.

(21) Appl. No.: 17/222,329

(22) Filed: Apr. 5, 2021

(65) Prior Publication Data
US 2022/0325154 A1    Oct. 13, 2022

(51) Int. Cl.
| C09J 183/04 | (2006.01) |
| C08G 77/00 | (2006.01) |
| C08G 77/44 | (2006.01) |
| C09J 183/10 | (2006.01) |

(52) U.S. Cl.
CPC ............ *C09J 183/04* (2013.01); *C08G 77/44* (2013.01); *C08G 77/70* (2013.01); *C09J 183/10* (2013.01); *C08G 2170/40* (2013.01)

(58) Field of Classification Search
CPC ...................................................... C09J 183/04
See application file for complete search history.

(56) References Cited

U.S. PATENT DOCUMENTS

| 5,162,410 A | 11/1992 | Sweet |
| 5,175,058 A | 12/1992 | Traver |
| 5,602,214 A | 2/1997 | Lin et al. |
| 5,726,256 A | 3/1998 | Benson et al. |
| 5,861,472 A | 1/1999 | Cifuentes et al. |
| 8,017,712 B2 * | 9/2011 | Berry ................... C08G 77/32  528/25 |
| 10,351,742 B2 | 7/2019 | Brown et al. |

FOREIGN PATENT DOCUMENTS

| CN | 112280528 A | * | 1/2021 |
| EP | 688 847 A2 | * | 12/1995 |
| JP | 2004-506778 A | * | 3/2004 |
| JP | 2015-193803 A | * | 11/2015 |
| JP | 2015-193803 A | * | 11/2015 |
| WO | 2007067332 | | 6/2007 |
| WO | 2011031452 | | 3/2011 |
| WO | 2013086121 A1 | | 6/2013 |
| WO | 2014074336 A1 | | 5/2014 |
| WO | 2018132941 | | 7/2018 |
| WO | 2020090781 | | 5/2020 |
| WO | 2020099999 | | 5/2020 |

OTHER PUBLICATIONS

Machine translation of CN 112280528 (no date).*
Machine translation of JP 2015-193803 (no date).*
Machine translation of JP 05-302035 (no date).*
Machine translation of JP 2004-506778A (no date).*
Machine translation of JP 2015-193803A (no date).*
Patent Cooperation Treaty (PCT), International Search Report and Written Opinion for Application PCT/US2022/022420 filed Mar. 30, 2022 mailed Jul. 18, 2022, International Searching Authority, EP.

* cited by examiner

*Primary Examiner* — Marc S Zimmer
(74) *Attorney, Agent, or Firm* — James Abruzzo; McDonald Hopkins LLC

(57) ABSTRACT

A process for producing a silicone pressure sensitive adhesive is shown and described herein. The process comprises reacting a MQ silicone resin with a polydiorganosiloxane in the absence of a solvent. The MQ silicone resin is a solid, solventless MQ resin. The reaction may be conducted in the presence of a catalyst, a chain extension reagent, or a combination thereof, and the resulting pressure sensitive adhesive can be dissolved in a solvent and the solids content adjusted. The present method provides a manner to provide a cleaner adhesive material that is free of unwanted materials such as aromatic solvents and also substantially free of cyclic siloxane impurities.

29 Claims, No Drawings

SILICONE PRESSURE SENSITIVE ADHESIVE AND METHOD OF MAKING THE SAME

FIELD OF INVENTION

The present invention relates to a silicone pressure sensitive adhesive and methods of making such adhesive. In particular, the present invention relates to a silicone pressure sensitive adhesive that is substantially free of aromatic solvents and/or cyclic siloxanes and a method of making such adhesives, where the method is conducted in the absence of a solvent.

BACKGROUND

Silicone pressure sensitive adhesives are an important class of adhesives used in a wide variety of applications. Silicone pressure sensitive adhesives are employed in high temperature, industrial, electronics, medical/healthcare, and drug delivery applications.

Many silicone pressure sensitive adhesives are produced by solution condensation of a branched silicone resin (an MQ resin) with a polydiorganosiloxane in the presence of a condensation catalyst. The reaction is conventionally carried out in a solvent, which is most often an aromatic solvent such as benzene, toluene, and/or xylene (BTX solvents) with subsequent curing via peroxide radicals. Another avenue for forming silicone pressure sensitive adhesives is addition curing of a vinyl containing siloxane polymer and a hydride containing siloxane oligomer using a platinum catalyst.

Solution condensation methods are generally the more preferred route in the industry to prepare silicone pressure sensitive adhesives. Solution condensation generally provides pressure sensitive adhesives with better adhesive properties and thermal performance compared to those prepared via the two-part addition curing methods. Additionally, most MQ resins are available in a BTX type solvent, thus making that process easier to use. There are some shortcomings with the condensation process such as coloring or haziness of the adhesive and salt formation/residual ion content due to neutralization of the condensation catalyst. Despite this, condensation curable silicone pressure sensitive adhesives are widely known and described in the art.

U.S. Pat. No. 5,726,256 describes producing silicone PSAs using a weak organic acid or metal salt to catalyze the condensation of benzene soluble MQ resin with a polydiorganosiloxane gum.

U.S. Pat. No. 5,861,472 describes a method of preparing silicone PSA compositions by heating a mixture of a polydiorganosiloxane polymer, a silicone resin copolymer, a thermal stabilizer, and an equilibration catalyst, such as potassium silanolate, in toluene.

U.S. Pat. No. 5,162,410 describes a process for producing a hot melt silicone PSA by homogenously mixing a silicone gum (phenylmethyl) and a MQ resin (in a xylene solution), with an ammonium carbonate catalyst and heating the mixture to 100° C. The volatile components are subsequently stripped off at 100° C.

WO 2007/067332A2 describes a continuous method for synthesizing a silicone PSA by mixing a hydroxyl-functional polydiorganosiloxane polymer with a hydroxyl-functional polyorganosiloxane resin and a solvent (xylene). The composition is heated above the vaporization point of the solvent and all volatile species are removed using twin-screw extruder.

U.S. Pat. No. 5,175,058 describes a silicone PSA composition comprising a homogeneous mixture of two intermediate pressure sensitive adhesive compositions in toluene.

U.S. Pat. No. 5,602,214 describes a method for synthesizing a silicone PSA having excellent peel adhesive strength, high tack, and quick stick capability in toluene.

U.S. Pat. No. 10,351,742 describes providing a solventless MQ silicone resin to remove an aromatic resin and then redissolving the MQ resin in a different volatile solvent before mixing and reacting with a polydiorganosiloxane. The starting MQ resin is treated to remove the volatile aromatic solvent and then redisolved in volatile solvent free of such aromatic solvents prior to the reaction with the polydiorganosiloxane.

WO 2011/031452A1 describes a process of making a silicone PSA by condensing a low viscous polyorganosiloxanes gum and deliberately adding a silicone MQ resin in a xylene solvent or silicone fluids during the polymerization process.

WO 2018/132941A1 describes a process of making silicone PSA curable composition at a temperature no greater than 35° C. by mixing a polyorganosiloxane resin with a silanol-terminated polydiorganosiloxane gum in an organic solvent (toluene and xylene mixture) and subsequently mixing that material with an amino-functional alkoxysilane and a silyl phosphate compound.

WO 2020/090781 describes a process of making a silicone PSA having a reduced residual silanol content by base catalyzed condensation of an MQ resin with a polyorganosiloxane gum in n-heptane.

WO2020/099999 describes a hot melt process for making a silicone PSA with improve adhesion properties while minimizing skin damage and pain during removal. The process includes the base catalyzed condensation, e.g., using ammonia, of a silanol end group-containing linear organopolysiloxane with a solid silicate MQ resin in the presence of a non-functional linear organopolysiloxane.

Despite these various processes, there is still an interest to provide a process to produce a cleaner pressure sensitive adhesive with excellent adhesive properties.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Provided are silicone pressure sensitive adhesives and a method of producing such adhesives. The silicone pressure sensitive adhesives are prepared by reacting at least one substantially solid, solventless MQ resin and at least one polydiorganosiloxane wherein the pressure sensitive adhesives are substantially free of solvents, in particular of aromatic solvents and, more particularly, of benzene, toluene, and xylene type solvents.

Substantially free of solvents for purposes of this application, means <5 ppm for solvents and <100 ppm for cyclics. Preferably less than 100 ppm, more preferably <50 ppm and most preferably less than 20 ppm of cyclics.

In one embodiment, the method of making the silicone pressure sensitive adhesives comprises reacting an MQ resin with a polydiorganosiloxane in the presence of a catalyst, where the reaction is free of a solvent. The MQ resin employed in the reaction is a solid, solventless MQ resin.

In another embodiment, the method comprises reacting an MQ resin, a polydiorganosiloxane, and a chain extension agent selected from a hexaalkyl cyclotrisilazane or bis(alkylamino)silane in the absence of a solvent to produce a silicone pressure sensitive adhesive material.

In one aspect, provided is a process for producing a pressure sensitive adhesive comprising: reacting at least one MQ silicone resin with at least one polydiorganosiloxane, wherein the MQ silicone resin is a solid, solventless resin, and the reaction is conducted in the absence of a solvent.

In one embodiment, the MQ silicone resin is present in an amount of from about 40 wt. % to about 70 wt. % and the polydiorganosiloxane is present in an amount of from about 60 wt. % to about 30 wt. % based on the total weight of the MQ silicone resin and the polydiorganosiloxane.

In one embodiment, the reaction is carried out at a temperature of from about 25° C. to about 200° C.

In one embodiment, the reaction is carried out a temperature of from about 50° C. to about 150° C.

In one embodiment, wherein the reaction is conducted in the presence of a catalyst, a chain extension agent, or combination thereof.

In one embodiment, the catalyst is selected from hydrochloric acid, phosphoric acid, a polyphosphoric acid, a carboxylic acid, a metal salt of a carboxylic acid, an alkali metal oxide, an alkali metal alkoxide, an alkali metal hydroxide, an alkali metal silanolate, an alkali metal siloxanolate, an alkali metal amide, an alkyl metal, an ammonia, amine, an ammonium hydroxide, a quaternary phosphonium hydroxide, or a combination of two or more thereof.

In one embodiment, the process comprises at least one chain extension reagent selected from a silazane, a metal silanolate, a metal siloxalonate, a bis(alkylamino)dialkylsilane, a bis(alkylamino)dialkenylsilane, or combination of two or more thereof.

In one embodiment, the silazane is selected from a disilazane, a trisilazane, a tetrasilazane, or a combination of two or more thereof.

In one embodiment, the silazane is selected from an alkyl or alkenyl substituted cyclosilazane having a ring size 6 or 8, a linear alkyl or polyalkyl substituted polysilazane, or a combination of two or more thereof.

In one embodiment, the silazane is selected from 2,2,5,5-tetramethyl-2,5-disila-1-azacyclopentane, 2,2,6,6-tetramethyl-2,6-disila-1-azacyclohexane, hexamethyldisilazane, 2,2,4,4,6,6-hexamethylcyclotrisilazane, 2,4,6-trimethyl-2,4,6-trivinylcyclotrisilazane, 2,2,4,4,6,6,8,8-octamethylcyclotetrasilazane, 1,1,3,3-tetramethyldisilazane, 1,3-diethyl-1,1,3,3-tetramethyldisilazane, or a combination of two or more thereof.

In one embodiment, the metal siloxanolate is selected from potassium siloxanolate, lithium siloxanolate, sodium siloxanolate, or a combination of two or more thereof.

In one embodiment, the bis(alkylamino)dialkylsilane or bis(alkylamino)dialkenyl silane is selected from bis(methylamino)dimethylsilane, bis(methylamino)diethylsilane, bis(methylamino)divinylsilane, bis(methylamino)di-n-propylsilane, bis(methylamino)diisopropylsilane, bis(methylamino)di-n-butylsilane, bis(methylamino)diisobutylsilane, bis(methylamino)di-sec-butylsilane, bis(methylamino)di-t-butylsilane, bis(methylamino)di-n-neopentylsilane, bis(methylamino)dicyclopentylsilane, bis(methylamino)dicyclohexylsilane, bis(methylamino)di-4-methoxyphenylsilane, bis(methylamino)methylethylsilane, bis(methylamino)methyl-t-butylsilane, bis(methylamino)methylphenylsilane, bis(methylamino)ethyl-t-butylsilane, bis(methylamino)secbutylmethylsilane, bis(methylamino)sec-butylethylsilane, bis(methylamino)methylcyclopentylsilane, bis(methylamino)ethylcyclopentylsilane, bis(methylamino)cyclopentylcyclohexylsilane, bis(methylamino)methylcyclohexylsilane, bis(methylamino)didecahydronaphthylsilane, bis(methylamino)thexylmethylsilane, bis(ethylamino)dimethylsilane, bis(ethylamino)diethylsilane, bis(ethylamino)divinylsilane, bis(ethylamino)di-n-propylsilane, bis(ethylamino)diisopropylsilane, bis(ethylamino)di-n-butylsilane, bis(ethylamino)diisobutylsilane, bis(ethylamino)di-sec-butylsilane, bis(ethylamino)di-t-butylsilane, bis(ethylamino)dicyclopentylsilane, bis(ethylamino)dicyclohexylsilane, bis(ethylamino)didecahydronaphthylsilane, bis(ethylamino)methylethylsilane, bis(ethylamino)methyl-t-butylsilane, bis(ethylamino)methylphenylsilane, bis(ethylamino)ethyl-t-butylsilane, bis(ethylamino)sec-butylmethylsilane, bis(ethylamino)sec-butylethylsilane, bis(ethylamino)methylcyclopentylsilane, bis(ethylamino)cyclopentylcyclohexylsilane, bis(ethylamino)methylcyclohexylsilane, bis(ethylamino)t-butylisobutylsilane, bis(ethylamino)cyclohexylthexylsilane, bis(n-propylamino)dimethylsilane, bis(n-propylamino)diethylsilane, bis(n-propylamino)divinylsilane, bis(n-propylamino)di-n-propylsilane, bis(n-propylamino)diisopropylsilane, bis(n-propylamino)di-n-butylsilane, bis(n-propylamino)diisobutylsilane, bis(n-propylamino)di-sec-butylsilane, bis(n-propylamino)di-t-butylsilane, bis(n-propylamino)di-n-neopentylsilane, bis(n-propylamino)dicyclopentylsilane, bis(n-propylamino)dicyclohexylsilane, bis(isopropylamino)dimethylsilane, bis(isopropylamino)diethylsilane, bis(isopropylamino)divinylsilane, bis(isopropylamino)di-n-propylsilane, bis(isopropylamino)diisopropylsilane, bis(isopropylamino)di-n-butylsilane, bis(isopropylamino)diisobutylsilane, bis(isopropylamino)di-sec-butylsilane, bis(isopropylamino)di-t-butylsilane, bis(isopropylamino)dineopentylsilane, bis(isopropylamino)dicyclopentylsilane, bis(isopropylamino)dicyclohexylsilane, or a combination of two or more thereof.

In one embodiment, the process further comprises heating at a temperature sufficient to decompose the catalyst or remove an ammonia byproduct, an amine byproduct, or combination thereof when a chain extension agent is utilized.

In one embodiment, the polydiorganosiloxane is of the formula:

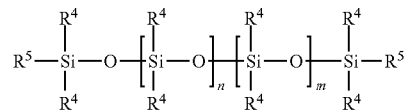

where each $R^4$ is independently selected from an alkyl, alkenyl, aromatic, arylalkyl, and fluoroalkyl, $R^5$ is —OH, and n+m is 50 or greater such that the polydiorganosiloxane has a viscosity of from about 500 cPs to about 200,000,000 cPs In one embodiment, the polydiorganosiloxane has a viscosity of from about 20,000 cPs to about 200,000,000 cPs.

In one embodiment, the polydiorganosiloxane has a viscosity of about 25,000 cPs to about 150,000,000 cPs.

In one embodiment, the polydiorganosiloxane comprises a mixture of two or more polydiorganosiloxanes.

In one embodiment, the mixture of two or more polydiorganosiloxanes comprises a first polydiorganosiloxane of a first viscosity of about 100,000 cPs to about 450,000 cPs, and a second viscosity of from about 300,000 cPs to about 750,000 cPs, where the second polydiorganosiloxane has a viscosity greater than that of the first polydiorganosiloxane.

In one embodiment, the MQ silicone resin has a density in the range of about 0.3 to about 0.9 g/cm$^3$.

In one embodiment, the MQ silicone resin has a ratio of M units to Q units of from 0.2:1 to 1.7:1.

In one embodiment, the MQ resin comprises from about 2% to about 12% free Si—OH functional groups.

In one embodiment, the process comprises exposing the reaction to nitrogen sparging.

In one embodiment, the reaction is conducted under vacuum for a period of time.

In one embodiment, the process comprises dissolving the pressure sensitive adhesive in a non-aromatic solvent.

In one embodiment, the pressure sensitive adhesive produced from the process has a cyclic siloxane content of about 2000 ppm or less.

In one embodiment, the pressure sensitive adhesive produced from the process has an octamethylcyclotetrasiloxane content of about 2000 ppm or less; a decamethylcyclopentasiloxane content of about 2000 ppm or less; and/or a dodecamethylcyclohexasiloxane content of about 2000 ppm or less.

In one embodiment, the pressure sensitive adhesive produced from the process has an octamethylcyclotetrasiloxane content of about 1000 ppm or less; a decamethylcyclopentasiloxane content of about 1000 ppm or less; and/or a dodecamethylcyclohexasiloxane content of about 1000 ppm or less.

In one embodiment, the pressure sensitive adhesive produced from the process has an octamethylcyclotetrasiloxane content of about 500 ppm or less; a decamethylcyclopentasiloxane content of about 500 ppm or less; and/or a dodecamethylcyclohexasiloxane content of about 500 ppm or less.

In one embodiment, the pressure sensitive adhesive produced from the process has an octamethylcyclotetrasiloxane content of about 500 ppm or less; a decamethylcyclopentasiloxane content of about 500 ppm or less; and/or a dodecamethylcyclohexasiloxane content of about 500 ppm.

Applicant has found that the condensation reaction itself can be conducted in the absence of a solvent to produce a silicone pressure sensitive adhesive material. Additionally, the method has been found to produce silicone pressure sensitive adhesives having a low content of cyclic siloxanes.

The following description discloses various illustrative aspects. Some improvements and novel aspects may be expressly identified, while others may be apparent from the description.

DETAILED DESCRIPTION

Reference will now be made to exemplary embodiments, examples of which are illustrated in the description and examples. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

A silicone pressure sensitive adhesive in accordance with the present technology is provided by the reaction of (i) a MQ silicone resin that is free of a volatile solvent, and (ii) a polydiorganosiloxane, where the reaction is conducted in the absence of a volatile solvent. The reaction may be conducted in the presence of a catalyst. The catalyst may be removed by degrading the catalyst, e.g., by heating. The viscosity of the resulting pressure sensitive adhesive may be adjusted via an appropriate, non-aromatic solvent.

The MQ resin is provided as a resin material that is substantially free of any volatile solvent. In particular, the MQ resin is free of any aromatic solvents and especially free of any benzene, toluene, and/or xylene type solvents. The MQ resin may be solid in form. For purposes of the application, free of solvents for purposes of this application, means <5 ppm for solvents and <100 ppm for cyclics. Preferably less than 100 ppm, more preferably <50 ppm and most preferably less than 20 ppm of cyclics.

MQ resin materials are generally provided or obtained as disposed in a volatile solvent such as aromatic, e.g., BTX type, solvents. The solvent can be removed in any suitable manner. In one embodiment, the solventless MQ resin can be provided removing the solvent via an extrusion process. Such a process is described in U.S. Pat. No. 8,017,712, which is incorporated herein by reference in its entirety. In another embodiment, the solventless MQ resin can be provided by removing the solvent via a spray drying process as described in U.S. Pat. No. 5,324,806.

The MQ resin is not particularly limited and comprises a polymer of M units represented by the formula $R^1_3SiO_{1/2}$ and Q units of the formula SiO4/2. The MQ resin is primarily formed of such M and Q units but may contain some residual D units ($R^2_2SiO_{2/2}$) and T units ($R^3SiO_{3/2}$). Generally, the MQ resin contains less than 20 mole % of D and T units, less than 15 mole % of D and T units, less than 10 mole % of D and T units, less than 5 mole % of D and T units, even less than 1-mole % of D and T units.

In the MQ resin, $R^1$, $R^2$, and $R^3$ are each independently selected from a C1-C6 monovalent hydrocarbon, a C5-C20 cycloaliphatic radical, a C2-C6 olefinic radical, and a C6-C20 aromatic radical. Examples of suitable C1-C6 monovalent hydrocarbon radicals include, but are not limited to, methyl, ethyl, propyl, isopropyl, butyl, isobutyl, tert-butyl, pentyl, isopentyl, and hexyl. Examples of suitable cycloaliphatic radicals include, but are not limited to, cyclopentyl, cyclohexyl, cycloheptyl, cyclooctyl, etc. Examples of suitable C2-C6 olefinic radicals include, but are not limited to, vinyl, allyl, etc. Examples of suitable aromatic radicals include, but are not limited to, phenyl. The respective $R^1$, $R^2$, and $R^3$ groups can be the same or different within a given M, D, or T unit. In one embodiment, from about 95 to 100% of the $R^1$, $R^2$, and/or $R^3$ groups are methyl. In one embodiment, substantially all the $R^1$, $R^2$, and/or $R^3$ groups are free of unsaturation. In one embodiment, the MQ resin has from 0 to 0.5 mole % of the $R^1$, $R^2$, and $R^3$ groups contain any unsaturation.

The solid, solventless MQ resin has a density in the range of 0.3 to 0.9 g/cm³. The ratio of M units to Q units is on the order of 0.2:1 or greater. In one embodiment, the ratio of M units to Q units is from 0.2:1 to 1.7:1. The MQ resin may comprise some free Si—OH groups. In embodiments, the MQ resin comprises from about 2% to about 12% free Si—OH functional groups, from about 4% to about 10% free Si—OH functional groups, or from about 5% to about 8% free Si—OH functional groups.

The polydiorganosiloxane is selected from a hydroxyl functional polydiorganosiloxane. Polydiorganosiloxanes may also be referred to herein as a silicone gum. In accordance with the present technology, the silicone gum may be a low to high molecular weight gum.

In one embodiment, the polydiorganosiloxnae is of the formula:

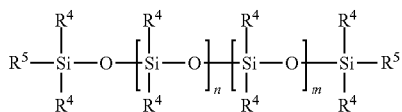

where each $R^4$ is independently selected from an alkyl, alkenyl, aromatic, arylalkyl, and fluoroalkyl, and $R^5$ is —OH, wherein n+m is 50 or greater such that the polydiorganosiloxane has a viscosity of from about 500 cPs to about 200,000,000 cPs. In one embodiment, $R^4$ is independently selected from a C1-C10 alkyl, a C2-C10 alkenyl, a C6-C20 aromatic, a C7-C20 arylalkyl, and a C1-C10 fluoroalkyl. The fluoroalkyl groups are such that one or more of the hydrogen atoms of the alkyl group are replaced by a fluorine atom; in embodiments, the fluoroalkyl may be selected from a perfluoroinated alkyl group. In one embodiment, each $R^4$ is an alkyl group, and in embodiments each $R^4$ is methyl. In one embodiment, the $R^4$ groups in the m unit are alkyls, and in embodiments methyl, and the $R^4$ groups in the y unit are aromatic groups, and in embodiments phenyl.

The polydiorganosiloxane can comprise a blend of polydiorganosiloxanes of different viscosities. In one embodiment, the polydiorganosiloxane comprises a first polydiorganosiloxane of a first viscosity of about 100,000 cPs to about 450,000 cPs, and a second viscosity of from about 300,000 cPs to about 750,000 cPs, where the second polydiorganosiloxane has a viscosity greater than that of the first polydiorganosiloxane.

In forming the adhesive, the solid MQ resin is present in an amount about 20 wt. % to 70 wt. %, from about 25 wt. % to about 65 wt. %, from about 45 wt. % to about 60 wt. %, or from about 50 wt. % to about 55 wt. %; and the polydiorganosiloxane is present in an amount of from about 30 wt. % to about 80 wt. %, from about 35 wt. % to about 75 wt. %, from about 40 wt. % to about 55 wt. %, or from about 45 wt. % to about 50 wt. %.

The catalyst is not particularly limited and may be selected from any suitable condensation catalyst. The condensation catalyst can, for example, be an acid catalyst or a base catalyst. The acid catalyst can be an inorganic catalyst or an organic acid catalyst. Examples of inorganic acid catalysts include, but are not limited to, hydrochloric acid, phosphoric acid and polyphosphoric acid. Examples of organic acid catalysts include, but are not limited to, carboxylic acids such as, but not limited to, acetic acid, benzoic acid, propanoic acid, butanoic acid, formic acid, and metal salts of carboxylic acids wherein the metal is selected from, but not limited to, the group consisting of Li, Na, K, Ce, and Ca. Non-limiting examples of metal salts of carboxylic acids include, but are not limited to, potassium formate or potassium acetate. A base catalyst can be selected from, but are not limited to, alkali metal oxides, alkali metal alkoxides, alkali metal hydroxides, alkali metal silanolates, alkali metal siloxanolates, alkali metal amides, alkyl metals, ammonia, amines, and ammonia compounds such as ammonium hydroxide and substituted ammonium hydroxides. An exemplary alkali metal oxide is, but is not limited to, sodium oxide. Examples of suitable alkali metal alkoxides include, but are not limited to, potassium ethoxide, sodium methoxide, lithium methoxide, and potassium isopropoxide. Examples of suitable alkali metal hydroxides include, but are not limited to, potassium hydroxide, lithium hydroxide, sodium hydroxide, and cesium hydroxide. Examples of suitable alkali metal amides include, but are not limited to, sodium amide and potassium amide. Examples of suitable alkyl metals include, but are not limited to, butyllithium. Examples of suitable amines include, but are not limited to, triethylamine and allylamine. Examples of suitable ammonium hydroxides include, but are not limited to, quaternary ammonium hydroxides such as tetramethylammonium hydroxide. The base catalyst can alternatively be a quaternary phosphonium hydroxide such as, but not limited to, tetrabutyl phosphonium hydroxide. The base catalyst can alternatively be a salt of a strong base and weak acid such as potassium carbonate.

In one embodiment, the base catalyst can be selected from a chain extension reagent or capping agents selected from a metal siloxalonates, a metal silanolate, a silazane, a bis(alkylamino)silane, or a combination of two or more thereof. Examples of suitable alkali metal silanolates include, but are not limited to, potassium silanolate, lithium silanolate, and sodium silanolate. Examples of suitable metal siloxanolates include, but are not limited to, potassium siloxanolate, lithium siloxanolate, and sodium siloxanolate. Examples of silazanes can be, but are not limited to, suitable bis-silazanes, trisilazanes, tetrasilazanes. Examples of such reagents include, but are not limited to, hexamethylcyclotrisilazane, trimethyltrivinylcyclotrisilazane, octamethylcyclotetrasilazane, alkyl or alkenyl substituted cyclosilazanes of ring sizes 6 or 8, linear alkyl or polyalkyl substituted polysilazanes. Some more specific examples of suitable silazanes include, but are not limited to, 1,1,3,3-tetramethyldisilazane, 1,3-diethyl-1,1,3,3-tetramethyldisilazane, hexamethyldisilazane; cyclic disilazane compounds such as 2,2,5,5-tetramethyl-2,5-disila-1-azacyclopentane and 2,2,6,6-tetramethyl-2,6-disila-1-azacyclohexane; cyclic trisilazane compounds such as 2,2,4,4,6,6-hexamethylcyclotrisilazane and 2,4,6-trimethyl-2,4,6-trivinylcyclotrisilazane; and cyclic tetrasilazane compounds such as 2,2,4,4,6,6,8,8-octamethylcyclotetrasilazane.

Examples of suitable bis(alkylamino)dialkylsilanes and bis(alkylamino)dialkenyl silanes include, but are not limited to bis(methylamino)dimethylsilane, bis(methylamino)diethylsilane, bis(methylamino)divinylsilane, bis(methylamino)di-n-propylsilane, bis(methylamino)diisopropylsilane, bis(methylamino)di-n-butylsilane, bis(methylamino)diisobutylsilane, bis(methylamino)di-sec-butylsilane, bis(methylamino)di-t-butylsilane, bis(methylamino)di-n-neopentylsilane, bis(methylamino)dicyclopentylsilane, bis(methylamino)dicyclohexylsilane, bis(methylamino)di-4-methoxyphenylsilane, bis(methylamino)methylethylsilane, bis(methylamino)methyl-t-butylsilane, bis(methylamino)m-ethylphenylsilane, bis(methylamino)ethyl-t-butylsilane, bis(methylamino)sec-butylmethylsilane, bis(methylamino)sec-butylethylsilane, bis(methylamino)methylcyclopentylsilane, bis(methylamino)ethylcycopentylsilane, bis(methylamino) cycopentylcyclohexylsilane, bis(methylamino)methylcyclohexylsilane, bis(methylamino)didecahydronaphthylsilane, bis(methylamino)thexylmethylsilane, bis(ethylamino)dimethylsilane, bis(ethylamino)diethylsilane, bis(ethylamino) divinylsilane, bis(ethylamino)di-n-propylsilane, bis(ethylamino)diisopropylsilane, bis(ethylamino)di-n-butylsilane, bis(ethylamino)diisobutylsilane, bis(ethylamino)di-sec-butylsilane, bis(ethylamino)di-t-butylsilane, bis(ethylamino) dicyclopentylsilane, bis(ethylamino)dicyclohexylsilane, bis(ethylamino)didecahydronaphthylsilane, bis(ethylamino) methylethylsilane, bis(ethylamino)methyl-t-butylsilane, bis(ethylamino)methylphenylsilane, bis(ethylamino)ethyl-t-butylsilane, bis(ethylamino)sec-butylmethylsilane, bis(ethylamino)sec-butylethylsilane, bis(ethylamino) methylcyclopentylsilane, bis(ethylamino) cyclopentylcyclohexylsilane, bis(ethylamino)methyl cyclohexylsilane, bis(ethylamino)t-butylisobutylsilane, bis(ethylamino)cyclohexylthexylsilane, bis(n-propylamino)dimethylsilane, bis(n-propylamino)diethylsilane, bis(n-propylamino)divinylsilane, bis(n-propylamino)di-n-propylsilane, bis(n-propylamino)diisopropylsilane, bis(n-propylamino)di-n-butylsilane, bis(n-propylamino)diisobutylsilane, bis(n-propylamino)di-sec-butylsilane, bis(n-propylamino)di-t-butylsilane, bis(n-propylamino)di-n-neopentylsilane, bis(n-propylamino)dicyclopentylsilane, bis(n-propylamino) dicyclohexylsilane, bis(isopropylamino)dimethylsilane, bis(isopropylamino)diethylsilane, bis(isopropylamino) divinylsilane, bis(isopropylamino)di-n-propylsilane, bis(isopropylamino)diisopropylsilane, bis(isopropylamino)di-n-butylsilane, bis(isopropylamino)diisobutylsilane, bis(isopropylamino)di-sec-butylsilane, bis(isopropylamino)di-t-butylsilane, bis(isopropylamino)dineopentylsilane, bis(isopropylamino)dicyclopentylsilane, bis(isopropylamino) dicyclohexylsilane, or a combination of two or more thereof.

When the composition includes such chain extension reagents, the amount used may range from 50% to 175% of stoichiometry based on available silanol content, preferably from 70 to 120% and most preferably from 90% to 110%.

In forming the adhesive, the catalyst is present in an amount about 0.3 wt. % to 10 wt. %, from about 0.5 wt. % to about 5 wt. %, or from about 1 wt. % to about 2 wt %.

The process for producing the silicone pressure sensitive adhesive comprises (i) mixing the solid, solventless MQ resin with the polydiorganosiloxane to form a first mixture; (ii) adding the catalyst to the first mixture to catalyze the reaction of the MQ resin and the polydiorganosiloxane to form a pressure sensitive adhesive composition; and (iii) removing the catalyst from the pressure sensitive adhesive composition, where the reaction is free of a solvent. The process may further comprise (iv) dissolving the pressure sensitive adhesive composition in a non-aromatic solvent and adjusting the solids content as desired.

Mixing the solid, solventless MQ resin and the polydiorganosiloxnae can be carried out at a suitable temperature to provide sufficient mixing and dispersion of the MQ resin in the polydiorganosiloxane. In embodiments, the mixture of the MQ resin and the polydiorganosiloxane can be heated at a temperature of from about 25° C. to about 200° C., from about 50° C. to about 150° C., or from about 75° C. to about 100° C. In one embodiment, the mixture of the MQ resin and the polydiorganosiloxane can be heated at a temperature of from about 120° C. to about 130° C.

After addition of the catalyst to the mixture of the MQ resin and the polydiorganosiloxane, the mixture can continue to be heated for a period of time sufficient to complete the condensation/crosslinking reaction. In embodiments, the mixture of the MQ resin, polydiorganosiloxane, and catalyst or chain extension agent can be heated at a temperature of from about 60° C. to about 200° C., from about 75° C. to about 175° C., or about 100° C. to about 150° C. The time for heating may vary. In embodiments, heating can be carried out for anywhere from 1 to 10 hours.

Without being bound to any particular theory, it may be appreciated that, based on available silanol functionality, chain extension may occur via reaction with the lower molecular weight silanol terminated fluid resulting in the in-situ formation of a gum followed by condensation with theMQ silanol to produce a pressure sensitive adhesive.

It will be appreciated that the temperature of the mixture with the condensation catalyst will be, at least initially, lower than the temperature at which the catalyst will decompose. The reaction should be kept below the temperature at which the catalyst will decompose for a sufficient period of time to allow the condensation/crosslinking to be completed. After the condensation reaction reaches the end point, the temperature of the pressure sensitive adhesive composition can be brought to a temperature at which the catalyst will decompose. This allows for the catalyst to be easily removed from the system without a separate extraction step or treatment to otherwise remove the catalyst. The step of removing the catalyst can also be conducted under a nitrogen atmosphere or with a nitrogen purge to facilitate removal of the catalyst.

It will be appreciated that the temperature at which the reaction is conducted when using a chain extension agent will be sufficient to react silanol groups and remove ammonia or amine byproducts that may form but at a temperature low enough such that the chain extension agent is not volatilized and prematurely removed from the system.

For the purposes of this application, reaction completion or end point refers to reaching the desired melt viscosity.

The process can also be performed under suitable atmospheric conditions as may be desired or suitable to facilitate the formation of the adhesive. The system or mixture can be subjected to nitrogen sparging to remove any unwanted gases from the system and composition. Additionally, mixing of the composition can also be conducted under reduced pressure or vacuum as may be desired. In embodiments, mixing can be conducted under a pressure of from about 0.1 torr to about 760 torr; about 0.5 torr to about 500 torr; about 1 torr to about 250 torr; or from about 10 torr to about 100 torr. In one embodiment, mixing is conducted at a pressure of from about 0.1 torr to about 100 torr.

The resulting pressure sensitive adhesive is suitable for a variety of applications including those requiring or benefiting from a hot melt converting process. For applications requiring a solvent, the adhesive may be dissolved in a suitable solvent as further described herein.

The solids content of the resulting pressure sensitive adhesive can be adjusted as desired with an appropriate solvent. The solids content of the pressure sensitive adhesive can be selected as desired for a particular purpose or intended application. In one embodiment, the solids content of the pressure sensitive can be adjusted to be from about 30% to about 80%, from about 40% to about 70%, or from about 50% to about 60%. The solvent is preferably a non-aromatic solvent and, more preferably a solvent other than a BTX type solvent. Examples of suitable solvents that may be used to dissolve the pressure sensitive adhesive include, but are not limited to, hydrocarbon solvents, silicone solvents, an ester, a ketone, or an ether.

Examples of suitable aliphatic hydrocarbons include linear, branched, or cyclic aliphatic hydrocarbons having 6 to 16 carbon atoms, for example saturated acyclic aliphatic hydrocarbons (paraffins) such as heptane, hexane, octane, isooctane, decane, isodecane, isohexadecane or dodecane or isododecane and cyclic aliphatic hydrocarbons such as cyclohexane, methylcyclohexane or decahydronaphthalene. The aliphatic hydrocarbon solvent can be an alkene, for example heptene, cyclohexadiene, cyclohexene, or 2,5-dimethyl-2,4-hexadiene. Mixtures of aliphatic hydrocarbons are also suitable, for example the mixture of branched paraffins sold under the trademark IS OPAR®.

Examples of suitable volatile silicone solvents include, but are not limited to, linear, branched, and cyclic polydiorganosiloxanes, for example polydimethylsiloxanes such as linear trimethylsilyl-terminated polydimethylsiloxanes having a viscosity of 0.65 to 5 cP at 25° C., and cyclic polydimethylsiloxanes such as decamethylcyclopentasiloxane and octamethylcyclotetrasiloxane. Volatile silicone solvents can contain organic groups other than methyl, for example higher alkyl groups or phenyl groups. An example is 3-octyl heptamethyl trisiloxane. In one embodiment, viscosity is determined by dissolving the melt obtained PSA into a suitable solvent at 60% solids and measuring the viscosity at 25° C. with a Brookfield (DV1) Viscometer.

Examples of suitable ester solvents include, but are not limited to, carboxylate esters such as alkyl carboxylate esters and carbonate esters such as alkyl carbonate esters. For example the volatile solvent can comprise at least one C1-C8 alkyl ester of a C2-C4 carboxylic acid such as ethyl acetate or butyl acetate. Examples of suitable carbonate ester solvents include, but are not limited to, diethyl carbonate and dicaprylyl carbonate.

Examples of suitable ketone solvents include, but are not limited to, methyl isobutyl ketone (4-methyl-2-pentanone), 2-pentanone, 3-hexanone, and methyl isoamyl ketone (5-methyl-2-hexanone).

Examples of suitable ether solvents include, but are not limited to, dibutyl ether, volatile polyethers such as 1-(propoxymethoxy)propane and cyclic ethers such as cyclopentamethyl ether.

The pressure sensitive adhesive produced from the process can be used in a wide variety of applications. The silicone pressure sensitive adhesives prepared by the method of this invention will readily stick to support a solid support or substrate, whether flexible or rigid. These pressure sensitive adhesive compositions may be applied to a surface by any suitable means such as rolling, spreading or spraying. The surface of the support and the substrate to which the support is adhered may be any known solid material such as metals, paper, wood, leather, fabrics, organic polymeric materials, painted surfaces, siliceous materials such as concrete, bricks, cinderblocks, and glass including glass cloth. After applying it to the surface, the adhesive may be cured by air drying or heating for example at temperatures of up to 300° C.

Additionally, the pressure sensitive adhesives produced by the present technology may exhibit a low concentration of cyclic siloxanes. In embodiments, the pressure sensitive adhesive contains less than 2000 ppm, less than 1800 ppm, less than 1500 ppm, less than 1250 ppm, less than 1000 ppm less than 750 ppm, less than 500 ppm, less than 250 ppm, even less than 100 ppm of one or more of a octamethylcyclotetrasiloxane (D4), decamethylcyclopentasiloxane (D5), or dodecamethylcyclohexasiloxane (D6). In one embodiment, the pressure sensitive adhesive contains each of a D4, D5, or D6 cyclic siloxane in an amount of less than 2000 ppm, less than 1800 ppm, less than 1500 ppm, less than 1250 ppm, less than 1000 ppm less than 750 ppm, less than 500 ppm, less than 250 ppm, even less than 100 ppm The present technology has been described in the foregoing detailed description and with reference to various aspects and embodiments. The technology may be further understood with reference to the following Examples. The Examples are intended to further illustrate aspects and embodiments of the present technology and not necessarily to be limited to such aspects or embodiments.

EXAMPLES

MQ Silicone Resin

The solid MQ silicone resins which were used to prepare the pressure sensitive adhesives have a silanol content of 95473 ppm to 47746 ppm. The MQ resins employed are referred as MQ1 (silanol content of 95473 ppm), MQ2 (silanol content of 47746 ppm), and MQ3 (silanol content of 56642 ppm) resin.

Silicone Gum

Examples 1-6

Examples 1-6 illustrate the silicone gums employed in the examples and their properties like MW and cyclic content. MW was determined by Gel Permeation Chromatography (GPC) using Chloroform solvent and calibrated using polystyrene standards. The solution viscosity of a material was determined at 25° C. with a Brookfield (DV1) Viscometer using spindle #2 to #6. The concentration of cyclic siloxanes are quantified using gas chromatographic methods.

The silicone gum of Examples 1-6 are listed in Table 1-below:

TABLE 1

| | Silicone gum | | | | |
|---|---|---|---|---|---|
| Example | Description | CAS# | Viscosity (cPs) | MW (g/mol) | Octamethyl Cyclotetrasiloxane (D4) wt. % |
| 1 | Dimethyl siloxane gum | 556-67-2 | 50,000-250,0000 | $2.34 \times 10^5$ | <10 |
| 2 | Dimethyl siloxane gum | 556-67-2 | 300,000-750,000 | $5.8 \times 10^5$ | <10 |
| 3 | Methyl phenyl siloxane gum | | 50,000-250,000 | $3.83 \times 10^5$ | <10 |
| 4 | Methyl siloxane fluid | 556-67-2 | 2550-3570 | $3.74 \times 10^4$ | <1 |
| 5 | Methyl siloxane fluid | 556-67-2 | 25,000-35,000 | $5.83 \times 104$ | <1 |
| 6 | Methyl siloxane fluid | 556-67-2 | 500-800 | $2.14 \times 104$ | <1 |

Preparation of Silicone PSA

Examples 7-18

Example 7

The silicone gum of example 1 (287.23 grams) and example 2 (95.74 grams) was added followed by addition of MQ1-resin (517.02 grams) or vice versa in a 3-liter planetary mixture equipped with a helical blade, heating apparatus, thermocouple, and sparge tube (for $N_2$ sparging). The reactor temperature was set to 125-130° C. under positive nitrogen flow. The above mixture was agitated at 125-130° C. until a completely homogeneous solution/dispersion was obtained. The mixing process was continued for 1-4 hours until MQ resin was dissolved or dispersed completely in the gum mixture. 7.5 grams of Tetramethylammonium siloxanolate (CAS-No. 68440-88-0) was added, and the reaction continued for another 3 hours. Finally, the reactor temperature was increased to 150° C. and the temperature was held for 2-3 hours under $N_2$. After this step, the reactor was cooled. The solids content was then adjusted to 60% by dissolving the resulting high viscous mass in 40 parts ethyl acetate (~600 grams) at 50° C. The PSA viscosity was 33500 cP at 25° C. and had a GPC with multimodal resin and polymer peaks.

Example 8

The silicone gum of example 1 (287.23 grams) and example 2 (95.74 grams) was added followed by MQ1 resin (517.02 grams) or vice versa in a 3-liter planetary mixture equipped with a helical blade, heating apparatus, thermocouple, and sparge tube (for $N_2$ sparging). The reactor temperature was set to 125-130° C. under positive nitrogen flow. The above mixture was agitated at 125-130° C. until a completely homogeneous solution/dispersion was obtained. The mixing process was continued for 1-4 hours until the MQ resin was dissolved or dispersed completely in the gum mixture. 7.5 grams of Tetramethylammonium siloxanolate (CAS-No. 68440-88-0) was added, and the reaction continued for another 3 hours. Finally, the reactor temperature was increased to 150° C. and held there for 2-3 hours under $N_2$. After this step, the reactor was cooled. The solids content was then adjusted to 60% by dissolving the resulting high viscous mass in 40 parts heptane (~600 grams) at 50° C. The PSA viscosity was 15900 cP at 25° C. and had a GPC with multimodal resin and polymer peaks.

Example 9

The silicone gum of example 3 (80 grams) was added followed by addition of MQ1 resin (100 grams) or vice versa in a 1-liter planetary mixture equipped with a helical blade, heating apparatus, thermocouple, and sparge tube (for $N_2$ sparging). The reactor temperature was set to 125-130° C. under positive nitrogen flow. The above mixture was agitated at 125-130° C. until a completely homogeneous solution/dispersion was obtained. The mixing process was continued for 1-4 hours until the MQ resin was dissolved or dispersed completely in the gum mixture. 1.2 grams of Tetramethylammonium siloxanolate (CAS-No. 68440-88-0) was added and reaction continued for another 3 hours. Finally, the reactor temperature was increased to 150° C. and hold the temperature for 2-3 hours under $N_2$. After this step, the reactor was cooled. The solids content was then adjusted to 60% by dissolving the resulting high viscous mass in 40 parts heptane (~120 grams) at 50° C. The PSA viscosity was 13120 cP at 25° C. and had a GPC with multimodal resin and polymer peaks.

Example 10

The silicone gum of example 1 (287.23 grams) and example 2 (95.74 grams) was added followed by addition of MQ1 resin (100 grams) or vice versa in a 3-liter planetary mixture equipped with helical blade, heating apparatus, thermocouple, and sparge tube (for $N_2$ sparging). The reactor temperature was set to 125-130° C. under positive nitrogen flow. The above mixture was agitated at 125-130° C. until a completely homogeneous solution/dispersion was obtained.

The mixing process was continued for 1-4 hours until the MQ resin was dissolved or dispersed completely in the gum mixture. 10.50 grams of 25% Tetra ethylammonium hydroxide in methanol (CAS-No:77-98-5) was added, and the reaction continued for another 3 hours. Finally, the reactor temperature was increased to 150° C. and held at this temperature for 2-3 hours under $N_2$. After this step, the reactor was cooled. The solids content was then adjusted to 60% by dissolving the resulting high viscous mass in 40 parts heptane (~600 grams) at 50° C. The PSA viscosity was 10800 cPs at 25° C. and had a GPC with multimodal resin and polymer peaks.

Example 11

The silicone gum of example 4 (127.34 grams) was added followed by addition of MQ2 resin (172.65 grams) or vice versa in a 1-liter planetary mixture equipped with a helical blade, heating apparatus, thermocouple, and sparge tube (for $N_2$ sparging). The reactor temperature was set to 125-130° C. under positive nitrogen flow. The above mixture was agitated at 125-130° C. until a completely homogeneous solution/dispersion was obtained. The mixing process was continued for 1-4 hours until MQ resin was dissolved or dispersed completely in the gum mixture. 2.0 grams of 2,4,6-Trimethyl-2,4,6-trivinylcyclotrisilazane (CAS-No: 5505-72-6) was added and reaction continued for another 3 hours. Finally, the reactor temperature was increased to 150° C. and hold the temperature for 2-3 hours under $N_2$. After the cooking step, the reactor was cooled. The solids content was then adjusted to 60% by dissolving the resulting high viscous mass in 40 parts ethyl acetate (~200 grams) at 50° C. The PSA viscosity was 780 cP at 25° C. and had a GPC with multimodal resin and polymer peaks.

Example 12

The silicone gum of example 5 (133.33 grams) was added followed by MQ2 resin (166.66 grams) or vice versa in a 1-liter planetary mixture equipped with a helical blade, heating apparatus, thermocouple, and sparge tube (for $N_2$ sparging). The reactor temperature was set to 125-130° C. under positive nitrogen flow. The above mixture was agitated at 125-130° C. until a completely homogeneous solution/dispersion was obtained. The mixing process was continued for 1-4 hours until MQ resin was dissolved or dispersed completely in the gum mixture. 2.0 grams of 2,4,6-Trimethyl-2,4,6-trivinylcyclotrisilazane (CAS-No: 5505-72-6) was added and reaction continued for another 3 hours. Finally, the reactor temperature was increased to 150° C. and hold the temperature for 2-3 hours under $N_2$. After this step, the reactor was cooled. The solids content was then adjusted to 60% by dissolving the resulting high viscous mass in 40 parts ethyl acetate (~200 grams) at 50° C. The PSA viscosity was 1100 cP at 25° C. and had a GPC with multimodal resin and polymer peaks.

Example 13

The silicone gum of example 5 (133.33 grams) was added followed by MQ2 resin (166.66 grams) or vice versa in a 1-liter planetary mixture equipped with a helical blade, heating apparatus, thermocouple, and sparge tube (for $N_2$ sparging). The reactor temperature was set to 125-130° C. under positive nitrogen flow. The above mixture was agitated at 125-130° C. until a completely homogeneous solution/dispersion was obtained. The mixing process was continued for 1-4 hours until MQ resin was dissolved or dispersed completely in the gum mixture. 2.0 grams of 2,4,6-Trimethyl-2,4,6-trivinylcyclotrisilazane (CAS-No: 5505-72-6) was added and reaction continued for another 3 hours. Finally, the reactor temperature was increased to 150° C. and held at that temperature for 2-3 hours under $N_2$. After this step, the reactor was cooled. The solids content was then adjusted to 60% by dissolving the resulting high viscous mass in 40 parts heptane (~200 grams) at 50° C. The PSA viscosity was 1060 cP at 25° C. and had a GPC with multimodal resin and polymer peaks.

Example 14

The silicone gum of example 4 (120 grams) was added followed by addition of MQ2 resin (180 grams) or vice versa in a 1-liter planetary mixture equipped with a helical blade, heating apparatus, thermocouple, and sparge tube (for $N_2$ sparging). The reactor temperature was set to 125-130° C. under positive nitrogen flow. The above mixture was agitated at 125-130° C. until a completely homogeneous solution/dispersion was obtained. The mixing process was continued for 1-4 hours until MQ resin was dissolved or dispersed completely in the gum mixture. 2.0 grams of 2,4,6-Trimethyl-2,4,6-trivinylcyclotrisilazane (CAS-No: 5505-72-6) was added and reaction continued for another 3 hours. Finally, the reactor temperature was increased to 150° C. and held at that temperature for 2-3 hours under $N_2$. After this step, the reactor was cooled. The solids content was then adjusted to 60% by dissolving the resulting high viscous mass in 40 parts ethyl acetate (~200 grams) at 50° C. The PSA viscosity was 380 cP at 25° C. and had a GPC with multimodal resin and polymer peaks.

Example 15

Silicone gum of example 5 (120 grams) was added followed by addition of MQ2 resin (180 grams) or vice versa in a 1-liter planetary mixture equipped with a helical blade, heating apparatus, thermocouple, sparge tube (for $N_2$ sparging). The reactor temperature was set to 125-130° C. under positive nitrogen flow. The above mixture was agitated at 125-130° C. until a completely homogeneous solution/dispersion was obtained. The mixing process was continued for 1-4 hours until the MQ resin was dissolved or dispersed completely in the gum mixture. 2.0 grams of 2,4,6-Trimethyl-2,4,6-trivinylcyclotrisilazane (CAS-No:5505-72-6) was added and the reaction continued for another 3 hours. Finally, the reactor temperature was increased to 150° C. and held at that temperature for 2-3 hours under $N_2$. After the cooking step, the reactor was cooled. The solids content was then adjusted to 60% by dissolving the resulting high viscous mass in 40 parts ethyl acetate (~200 grams) at 50° C. The PSA viscosity was 530 cP at 25° C. and had a GPC with multimodal resin and polymer peaks.

Example 16

The silicone gum of example 4 (105.26 grams) was added followed by addition of the MQ3 resin (194.73 grams) or vice versa in a 1-liter planetary mixture equipped with a helical blade, heating apparatus, thermocouple, and sparge tube (for $N_2$ sparging). The reactor temperature was set to 125-130° C. under positive nitrogen flow. The above mixture was agitated at 125-130° C. until a completely homogeneous solution/dispersion was obtained. The mixing process was continued for 1-4 hours until the MQ resin was dissolved or dispersed completely in the gum mixture. 2.0 grams of 2,4,6-Trimethyl-2,4,6-trivinylcyclotrisilazane (CAS-No:5505-72-6) was added and reaction continued for another 3 hours. Finally, the reactor temperature was increased to 150° C. and hold the temperature for 2-3 hours under $N_2$. After this step, the reactor was cooled. The solids content was then adjusted to 60% by dissolving the resulting high viscous mass in 40 parts ethyl acetate (~200 grams) at 50° C. The PSA viscosity was 240 cP at 25° C. and had a GPC with multimodal resin and polymer peaks.

Example 17

The silicone gum of example 6 (45.28 grams) was added followed by addition of the MQ3 resin (74.71 grams) or vice versa in a 1-liter planetary mixture equipped with a helical blade, heating apparatus, thermocouple, and sparge tube (for $N_2$ sparging). The reactor temperature was set to 55° C. under positive nitrogen flow. The above mixture was agitated at 125-130° C. until a completely homogeneous solution/dispersion was obtained. The mixing process was continued for 6-8 hours until the MQ resin was dissolved or dispersed completely in the gum mixture. 0.3 grams of allylamine (CAS-No:107-11-9) was added and reaction continued for another 3 hours. Finally, the reactor temperature was increased to 55° C. and hold the temperature for 1 hour under $N_2$. After the condensation step, the reactor was cooled. The solids content was then adjusted to 60% by dissolving the resulting high viscous mass in 40 parts ethyl acetate (~80 grams) at 50° C. The PSA viscosity was 310 cP at 25° C. and had a GPC with multimodal resin and polymer peaks.

Example 18

The gum of example 6 (22.64 grams) and example 5 (22.64 grams) was added followed by addition of the MQ3 resin (74.71 grams) or vice versa in a 1-liter planetary mixture equipped with a helical blade, heating apparatus, thermocouple, and sparge tube (for $N_2$ sparging). The reactor temperature was set to 90° C. under positive nitrogen flow. The above mixture was agitated at 90° C. until a completely homogeneous solution/dispersion was obtained. The mixing process was continued for 4 hours until the MQ resin was dissolved or dispersed completely in the gum mixture. 0.3 grams of allylamine (CAS-No:107-11-9) was added and reaction continued for 1 hour. After the condensation step, the reactor was cooled. The solids content was then adjusted to 60% by dissolving the resulting high viscous mass in 40 parts heptane (~80 grams) at 50° C. The PSA viscosity was 1170 cPs at 25° C. and had a GPC with multimodal resin and polymer peaks.

Example 19

The gum of example 5 (200.0 grams) was added followed by three separate additions of the MQ2 resin (250.0 grams) in a 2-pint planetary ROSS mixture equipped with a rectangular blade, heating apparatus, thermocouple, and sparge tube (for $N_2$ sparging). The reactor temperature was set to 150° C. under positive nitrogen flow. The above mixture was agitated at 150° C. until a completely homogeneous solution/dispersion was obtained. Then the nitrogen sparge tube was replaced by a vacuum tube and the mixing process was continued under vacuum for 2 to 3 hours. 0.30 grams of dimethylbis(isopropylamino)silane (CAS-No:6026-42-2) was added and reaction continued for 1 to 2 hours. After the condensation step, the reactor was cooled. Roughly 1.5 g of solid product was placed on a 10"×10"25 μm PET film sitting on a hot press preheated at 100° C. Once the product was softened for 10 minutes, it was covered with Housewell FL167 fluorosilicone release liner and compressed with spacers at low pressure into a thin film. The resulting film was used for tack and peel measurement.

Example 20

The gum of example 6 (160.0 grams) was added followed by three separate additions of the MQ2 resin (200.0 grams) in a 2-pint planetary ROSS mixture equipped with a rectangular blade, heating apparatus, thermocouple, and sparge tube (for $N_2$ sparging). The reactor temperature was set to 150° C. under positive nitrogen flow. The above mixture was agitated at 150° C. until a completely homogeneous solution/dispersion was obtained. Then the nitrogen sparge tube was replaced by a vacuum tube and the mixing process was continued under vacuum for 2 to 3 hours. 0.35 grams of dimethylbis(isopropylamino)silane (CAS-No:6026-42-2) was added and reaction continued for 1 to 2 hours. After the condensation step, the reactor was cooled. Roughly 1.5 g of solid product was placed on a 10"×10"25 μm PET film sitting on a hot press preheated at 100° C. Once the product was softened for 10 minutes, it was covered with Housewell FL167 fluorosilicone release liner and compressed with spacers at low pressure into a thin film. The resulting film was used for tack and peel measurement.

Example 21

The gum of example 5 (160.0 grams) was added followed by three separate additions of the MQ2 resin (200.0 grams) in a 2-pint planetary ROSS mixture equipped with a rectangular blade, heating apparatus, thermocouple, and sparge tube (for $N_2$ sparging). The reactor temperature was set to 150° C. under positive nitrogen flow. The above mixture was agitated at 150° C. until a completely homogeneous solution/dispersion was obtained. Then the nitrogen sparge tube was replaced by a vacuum tube and the mixing process was continued under vacuum for 2 to 3 hours. 1.0 grams of 2,4,6-Trimethyl-2,4,6-trivinylcyclotrisilazane (CAS-No: 5505-72-6) was added and reaction continued for 1 to 2 hours. After the condensation step, the reactor was cooled. Roughly 1.5 g of solid product was placed on a 10"×10"25 μm PET film sitting on a hot press preheated at 100° C. Once the product was softened for 10 minutes, it was covered with Housewell FL167 fluorosilicone release liner and compressed with spacers at low pressure into a thin film. The resulting film was used for tack and peel measurement.

Example 22

The gum of example 6 (160.0 grams) was added followed by three separate additions of the MQ2 resin (200.0 grams) in a 2-pint planetary ROSS mixture equipped with a rectangular blade, heating apparatus, thermocouple, and sparge tube (for $N_2$ sparging). The reactor temperature was set to 150° C. under positive nitrogen flow. The above mixture was agitated at 150° C. until a completely homogeneous solution/dispersion was obtained. Then the nitrogen sparge tube was replaced by a vacuum tube and the mixing process was continued under vacuum for 2 to 3 hours. 2.0 grams of 2,4,6-Trimethyl-2,4,6-trivinylcyclotrisilazane (CAS-No: 5505-72-6) was added and reaction continued for 1 to 2 hours. After the condensation step, the reactor was cooled. Roughly 1.5 g of solid product was placed on a 10"×10"25 μm PET film sitting on a hot press preheated at 100° C. Once the product was softened for 10 minutes, it was covered with Housewell FL167 fluorosilicone release liner and compressed with spacers at low pressure into a thin film. The resulting film was used for tack and peel measurement.

Comparative Examples 1-4

Comparative Example 1

A solution of Example 1 (76.59 grams) and Example 2 (25.53 grams) with MQ3 resin (229.78) in heptane (68.1-grams) was added in a 1-liter planetary mixture equipped with a helical blade, heating apparatus, thermocouple, and sparge tube (for $N_2$ sparging) and a Dean Stark water trap filled with heptane. The mixture was homogeneously mixed at 90° C. for 3 hours under positive nitrogen flow. 1.5 grams of 1% lithium hydroxide solution was added and reaction continued for 3 hours. The temperature of the reaction was increased to 110° C. and the mixture refluxed until the last trace of water was observed. The neutralization step was performed at 70° C. using 1% phosphoric acid in IPA. The PSA viscosity was 9700 cP at 25° C. and had a GPC with multimodal resin and polymer peaks.

Comparative Example 2

A solution of Example 6 (45.28 grams) and MQ3 resin (74.71) in heptane (80 grams) was added in a 1-liter planetary mixture equipped with helical blade & heating apparatus, thermocouple, sparge tube (for $N_2$ sparging) and a Dean Stark water trap filled with heptane. The mixture was homogeneously mixed at 90° C. for 3 hours under positive nitrogen flow. 0.3 grams of allylamine (CAS-No:107-11-9) was added. The viscosity of the reaction mixture did not build up quickly, so the reaction was continued for another 8 hours. After 6 hours, a gel was formed. No further characterization was done.

Comparative Example 3

A solution of Example 4 (125 grams) and MQ2 resin (175 grams) in heptane (200 grams) was added in a 1-liter planetary mixture equipped with helical blade, a heating apparatus, thermocouple, sparge tube (for $N_2$ sparging) and a Dean Stark water trap filled with heptane. The mixture was homogeneously mixed at 80° C. for 3 hours under positive nitrogen flow. 2.0 grams of 2,4,6-Trimethyl-2,4,6-trivinyl-cyclotrisilazane (CAS-No:5505-72-6) was added and reaction continued for another 3 hours. The reactor was cooled after viscosity build up. The solids content was then adjusted to 60% and packed. The PSA viscosity was 230 cPs at 25° C. The material was gel on storage within 1-week time. No further PSA characterization was done.

Comparative Example 4

Commercial PSA610, Momentive Performance Material
Testing of the PSA Samples
PSA's were formulated by using 2% by weight benzoyl peroxide in 10 wt. % toluene solution or without benzoyl peroxide addition to a thickness of 25-35 micron for tack and adhesion measurements. The adhesive formulations were coated in polyimide substrate and dried for 2 minutes at 90°

C. followed by cured at 180° C. for 2 minutes in forced air ovens. Tack testing was done per FINAT FTM 9 for measuring tack with units of grams. Peel adhesion testing was done per ASTM D3330/D3330M measuring adhesion to mirrored stainless steel plates at 180 degrees peel angle. Peel adhesion results were recorded for 1-inch strips as N/in peel force from stainless steel panels at 12 ipm peel speed. SAFT testing was done according to Standard FINAT FTM 8. The results are as shown in Table 2. The solution viscosity of a material was determined at 25° C. with a Brookfield (DV1) Viscometer using spindle #2 to #6.

TABLE 2

Adhesive performance

| PSA | R/G ratio | With BPO (2%) curing [2 min @ 90° C., 2 min@180° C.] | | | | Without BPO curing [2 min@ 90° C.] | | | |
|---|---|---|---|---|---|---|---|---|---|
| | | SAFT | | Peel on SS | | SAFT | | Peel on SS | |
| | | Temp [° C.] | Time (min) | N/inch | Tack@ g | Temp [° C.] | Time (min) | N/inch | Tack@ g |
| Example 7 | 1.35 | 320 | 145 | 6.99 | 624.4 | 100 | 33 | 8.32 | 717.1 |
| Example 8 | 1.35 | 299 | 134 | 6.62 | 730.3 | 133 | 52 | 6.87 | 548.4 |
| Example 9 | 1.25 | 238 | 104 | 10.09 | 1038.5 | 102 | 36 | 10.3 | 919.1 |
| Example 10 | 1.35 | 288 | ≥120 | 6.54 | — | 115 | — | 6.79 | — |
| Example 11 | 1.35 | 123 | 47 | 2.82 | 790 | 78 | 24 | 4.22 | 616 |
| Example 13 | 1.25 | 315 | 145 | 6.32 | 640 | 120 | 45 | 6.68 | 609 |
| Example 19 | 1.25 | 294 | | 3.64 | | 82 | | 11.6* | 810* |
| Example 20 | 1.25 | | | | | 40 | | 5.8* | 710* |
| Example 21 | 1.25 | | | | | | | 10.0* | 740* |
| Example 22 | 1.25 | | | | | | | 6.6* | 780* |
| Comparative Example 1 | 1.35 | 308 | ≥120 | 6.19 | — | 96 | 42 | 7.58 | — |
| Comparative Example 4 | 1.33 | 299 | ≤60 | 697 | 740 | — | — | — | — |

*coated on 25 μm PET

Cyclics Estimation

Cyclics present in PSA were quantified using gas chromatographic method. Sample was extracted for 24 hours as described below.

Experimental Method: Approximately 0.5 g sample was weighed in a 20 mL vial. The weight of the sample was accurately recorded. A sample was extracted for 24 hours in 10 mL working solution prepared using acetone as solvent and toluene and dodecane as internal standards (0.05 mg/mL). Calibration plots for D4, D5 and D6 were generated by preparing various standards of concentration varying from 0.005 to 0.1 mg/mL in acetone. Peak area was normalized by dividing with peak area for dodecane and plotted against concentration. Cyclics present in the sample were calculated using normalized peak area in GC chromatogram of sample and the calibration curve.

GC Conditions

Instrument: Agilent 7890A GC

Detector: FID at 350° C.; H2: 30 mL/min, Air: 300 mL/min, makeup flow: 25.4 mL/min Sample Introduction: Split Injection/225° C./50:1 split ratio Injection Volume: 2 μL (Agilent 7693 Autosampler)

Carrier Gas: Nitrogen (1.4 mL/min, constant flow mode)

Capillary Column: Agilent HP-5 (30 m×0.32 mm×0.25 μm)

Temperature Program: 50° C. (5 min) to 200° C. at 15° C./min then to 315° C. (20 min)

TABLE 3

Cyclic estimation

| | Cyclic content (ppm) | | |
|---|---|---|---|
| PSA | D4 | D5 | D6 |
| Example 7 | <100 | 116 | 144 |
| Example 8 | <100 | <100 | <100 |
| Example 9 | <100 | <100 | <100 |
| Example 10 | 188 | 167 | 106 |

TABLE 3-continued

Cyclic estimation

| | Cyclic content (ppm) | | |
|---|---|---|---|
| PSA | D4 | D5 | D6 |
| Example 11 | <100 | <100 | <100 |
| Example 12 | <100 | <100 | <100 |
| Example 14 | <100 | 180 | <100 |
| Example 15 | <100 | 224 | <100 |
| Example 16 | <100 | <100 | <100 |
| Example 20 | <20 | <20 | 42 |
| Example 22 | <20 | <20 | 26 |
| Comparative Example 1 | >2000 | >2000 | >2000 |
| Comparative Example 4 | 1964 | 3365 | 1772 |

Silanol Content Estimation

The silanol content was determined using $^{29}$Si Nuclear Magnetic Resonance technique.

Experimental method: The sample was prepared by adding ~2 g of sample to 3 mL CDCl$_3$. 30 mg of Cr(acac)$_3$ was added as relaxation agent. 2.5 mL of sample solution was transferred to 10 mm Teflon tube and $^{29}$Si spectrum was acquired. Integration of all peaks in NMR spectrum gave mol % which was converted to wt. % by multiplying with repeat unit weight for corresponding species. Sample was analyzed by quantitative $^{29}$Si NMR spectroscopy on Bruker 400 MHz NMR. Experimental parameters:

System: Bruker 400 MHz
Probe: 10 mm $^{29}$Si probe
Pulse Program: ZGIG45
Recycle Delay: 5 seconds
Decoupling Method: Inverse Gated
Decoupling Sequence: WALTZ16
Number of Scans: 9472

TABLE 4

Silanol estimation

| PSA | MQ | MQ silanol content (ppm) | Catalyst | Catalyst concentration (wt %) | R/G ratio | Silanol content (ppm) | Residual silanol (%) |
|---|---|---|---|---|---|---|---|
| Example 8 | MQ 1 | 95473 | Tetramethylammonium siloxanolate | 0.5 | 1.35 | 32417 | 33.95 |
| Example 9 | MQ 1 | 95473 | Tetramethylammonium siloxanolate | 0.4 | 1.25 | 39154 | 41.01 |
| Example 10 | MQ 1 | 95473 | Tetra ethyl ammonium hydroxide | 0.7 | 1.35 | 46318 | 48.51 |
| Example 11 | MQ 2 | 47746 | 2,4,6-Trimethyl-2,4,6-trivinylcyclotrisilazane | 0.4 | 1.35 | 5408 | 11.33 |
| Example 12 | MQ 2 | 47746 | 2,4,6-Trimethyl-2,4,6-trivinylcyclotrisilazane | 0.4 | 1.25 | 7941 | 16.63 |
| Example 14 | MQ 2 | 47746 | 2,4,6-Trimethyl-2,4,6-trivinylcyclotrisilazane | 0.4 | 1.5 | 21519 | 45.07 |
| Example 15 | MQ 2 | 47746 | 2,4,6-Trimethyl-2,4,6-trivinylcyclotrisilazane | 0.4 | 1.5 | 25460 | 53.32 |
| Example 16 | MQ 3 | 56642 | 2,4,6-Trimethyl-2,4,6-trivinylcyclotrisilazane | 0.4 | 1.85 | 26356 | 46.53 |
| Example 19 | MQ 2 | 47746 | dimethylbis(isopropylamino)silane | 0.07 | 1.25 | ND | ND |
| Example 20 | MQ 2 | 47746 | Dimethylbis(isopropylamino)silane | 0.1 | 1.25 | ND | ND |
| Example 21 | MQ 2 | 47746 | 2,4,6-Trimethyl-2,4,6-trivinylcyclotrisilazane | 0.28 | 1.25 | ND | ND |
| Example 22 | MQ 2 | 47746 | 2,4,6-Trimethyl-2,4,6-trivinylcyclotrisilazane | 0.56 | 1.25 | ND | ND |
| Comparative Example 1 | MQ 3 | 56642 | LiOH | 0.37 | 1.35 | 16878 | 29.8 |

Viscoelastic Properties

The viscoelastic properties of the silicone PSA made by the new process were assessed on a dynamic spectrometer (DHR3 Rheometer, TA instrument). The silicone adhesive was dried at 150° C. for 1-hour and then it was transferred from release linear to 25 mm. diameter parallel plates and built up to a thickness of approx. of 1.0 mm. The silicone adhesive was characterized between an angular oscillation frequency sweep of from 0.1 to 100 rad/sec and 30° C. at less or equal to 0.01 percent strain.

The following viscoelastic parameters such as the storage modulus (G'), loss modulus (G") and dynamic viscosity were evaluated as a function of frequency:
1. Elastic Storage Modulus (G', dyne/cm$^2$)
2. Loss modulus (G", dyne/cm$^2$)
3. Dynamic Viscosity (Poise)

TABLE 5

Rheology

| PSA | PSA Composition [R/G] | G' [Dyne/cm2] w = 0.01 rad/s (T = 30° C.) | G" [Dyne/cm2] w = 0.01 rad/s (T = 30° C.) | Tan-d w = 0.01 rad/s (T = 30° C.) | [η*] (P) w = 0.01 rad/s (T = 30° C.) | G' [Dyne/cm2] w = 100 rad/s (T = 30° C.) | G" [Dyne/cm2] w = 100 rad/s (T = 30° C.) |
|---|---|---|---|---|---|---|---|
| Example 7 | 1.35 | $4.9 \times 10^5$ | $6.1 \times 10^5$ | 1.25 | $1.8 \times 10^7$ | $1.9 \times 10^7$ | $9.2 \times 10^6$ |
| Example 8 | 1.35 | $5.1 \times 10^5$ | $5.1 \times 10^5$ | 1 | $8.3 \times 10^6$ | $2 \times 10^7$ | $1 \times 10^7$ |
| Example 10 | 1.35 | $4.5 \times 10^5$ | $1.2 \times 10^6$ | 2.3 | $1.2 \times 10^8$ | $6.3 \times 10^7$ | $2.8 \times 10^7$ |
| Example 11 | 1.35 | $3.6 \times 10^4$ | $7.8 \times 10^4$ | 2.1 | $6.1 \times 10^6$ | $1.6 \times 10^7$ | $1.1 \times 10^7$ |
| Example 14 | 1.50 | $5.1 \times 10^5$ | $1 \times 10^6$ | 2 | $1.1 \times 10^8$ | $4.4 \times 10^7$ | $1.8 \times 10^7$ |
| Example 15 | 1.50 | $5.4 \times 10^5$ | $8.9 \times 10^5$ | 1.6 | $1.04 \times 10^8$ | $3.6 \times 10^7$ | $1.4 \times 10^7$ |
| Example 16 | 1.85 | $3.9 \times 10^6$ | $3.9 \times 10^6$ | 1 | $5.7 \times 10^8$ | $5.9 \times 10^7$ | $1.6 \times 10^7$ |
| Comparative Example 1 | 1.35 | $3.7 \times 10^4$ | $5.4 \times 10^4$ | 1.5 | $1.2 \times 10^6$ | $3.2 \times 10^6$ | $2 \times 10^6$ |

TABLE 5-continued

| | | Rheology | | | | | |
|---|---|---|---|---|---|---|---|
| PSA | PSA Composition [R/G] | G' [Dyne/cm2] w = 0.01 rad/s (T = 30° C.) | G" [Dyne/cm2] w = 0.01 rad/s (T = 30° C.) | Tan-d w = 0.01 rad/s (T = 30° C.) | [η*] (P) w = 0.01 rad/s (T = 30° C.) | G' [Dyne/cm2] w = 100 rad/s (T = 30° C.) | G" [Dyne/cm2] w = 100 rad/s (T = 30° C.) |
| Comparative Example 4 | 1.33 | $8.1 \times 10^4$ | $1.3 \times 10^5$ | 1.6 | $1 \times 10^7$ | $1.1 \times 10^7$ | $8 \times 10^6$ |

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a method for producing silicone pressure sensitive adhesives and pressure sensitive adhesives produced by such methods. Modifications may occur to those skilled in the art and to those who may make and use the invention. The disclosed embodiments are merely for illustrative purposes and not intended to limit the scope of the invention or the subject matter set forth in the claims.

What is claimed is:

1. A process for producing a pressure sensitive adhesive comprising:
   reacting at least one MQ silicone resin with at least one polydiorganosiloxane, wherein the MQ silicone resin is a solid, solventless resin, and the reaction is conducted in the absence of a solvent, wherein the reaction is carried out a temperature of from about 50° C. to about 150° C., and wherein the reaction is conducted in the presence of a chain extension agent selected from a silazane, a metal silanolate, a metal siloxalonate, a bis(alkylamino)dialkyl silane, a bis(alkylamino)dialkenyl silane, or combination of two or more thereof.

2. The process of claim 1, wherein the MQ silicone resin is present in an amount of from about 40 wt. % to about 70 wt. % and the polydiorganosiloxane is present in an amount of from about 60 wt. % to about 30 wt. % based on the total weight of the MQ silicone resin and the polydiorganosiloxane.

3. The process of claim 1, wherein the reaction is conducted in the presence of a catalyst.

4. The process of claim 3, wherein the catalyst is selected from hydrochloric acid, phosphoric acid, a polyphosphoric acid, a carboxylic acid, a metal salt of a carboxylic acid, an alkali metal oxide, an alkali metal alkoxide, an alkali metal hydroxide, an alkali metal silanolate, an alkali metal siloxanolate, an alkali metal amide, an alkyl metal, an ammonia, amine, an ammonium hydroxide, a quaternary phosphonium hydroxide, or a combination of two or more thereof.

5. The process of claim 1, wherein the silazane is selected from a disilazane, a trisilazane, a tetrasilazane, or a combination of two or more thereof.

6. The process of claim 1, wherein the silazane is selected from an alkyl or alkenyl substituted cyclosilazane having a ring size 6 or 8, a linear alkyl or polyalkyl substituted polysilazane, or a combination of two or more thereof.

7. The process of claim 1, wherein the silazane is selected from 2,2,5,5-tetramethyl-2,5-disila-1-azacyclopentane, 2,2,6,6-tetramethyl-2,6-disila-1-azacyclohexane, hexamethyldisilazane, 2,2,4,4,6,6-hexamethylcyclotrisilazane, 2,4,6-trimethyl-2,4,6-trivinylcyclotrisilazane, 2,2,4,4,6,6,8,8-octamethylcyclotetrasilazane, 1,1,3,3-tetramethyldisilazane, 1,3-diethyl-1,1,3,3-tetramethyldisilazane, or a combination of two or more thereof.

8. The process of claim 1, wherein the metal siloxanolate is selected from potassium siloxanolate, lithium siloxanolate, sodium siloxanolate, or a combination of two or more thereof.

9. The process of claim 1, wherein the bis(alkylamino)dialkylsilane or bis(alkylamino)dialkenyl silane is selected from bis(methylamino)dimethylsilane, bis(methylamino)diethylsilane, bis(methylamino)divinylsilane, bis(methylamino)di-n-propylsilane, bis(methylamino)diisopropylsilane, bis(methylamino)di-n-butylsilane, bis(methylamino)diisobutylsilane, bis(methylamino)di-sec-butylsilane, bis(methylamino)di-t-butylsilane, bis(methylamino)di-n-neopentylsilane, bis(methylamino)dicyclopentylsilane, bis(methylamino)dicyclohexylsilane, bis(methylamino)di-4-methoxyphenylsilane, bis(methylamino)methylethylsilane, bis(methylamino)methyl-t-butylsilane, bis(methylamino)methylphenylsilane, bis(methylamino)ethyl-t-butylsilane, bis(methylamino)sec-butylmethylsilane, bis(methylamino)sec-butylethylsilane, bis(methylamino)methylcyclopentylsilane, bis(methylamino)ethylcyclopentylsilane, bis(methylamino)cyclopentylcyclohexylsilane, bis(methylamino)methylcyclohexylsilane, bis(methylamino)didecahydronaphthylsilane, bis(methylamino)thexylmethylsilane, bis(ethylamino)dimethylsilane, bis(ethylamino)diethylsilane, bis(ethylamino)divinylsilane, bis(ethylamino)di-n-propylsilane, bis(ethylamino)diisopropylsilane, bis(ethylamino)di-n-butylsilane, bis(ethylamino)diisobutylsilane, bis(ethylamino)di-sec-butylsilane, bis(ethylamino)di-t-butylsilane, bis(ethylamino)dicyclopentylsilane, bis(ethylamino)dicyclohexylsilane, bis(ethylamino)didecahydronaphthylsilane, bis(ethylamino)methylethylsilane, bis(ethylamino)methyl-t-butylsilane, bis(ethylamino)methylphenylsilane, bis(ethylamino)ethyl-t-butylsilane, bis(ethylamino)sec-butylmethylsilane, bis(ethylamino)sec-butylethylsilane, bis(ethylamino)methylcyclopentylsilane, bis(ethylamino)cyclopentylcyclohexylsilane, bis(ethylamino)methylcyclohexylsilane, bis(ethylamino)t-butylisobutylsilane, bis(ethylamino)cyclohexylthexylsilane, bis(n-propylamino)dimethylsilane, bis(n-propylamino)diethylsilane, bis(n-propylamino)divinylsilane, bis(n-propylamino)di-n-propylsilane, bis(n-propylamino)diisopropylsilane, bis(n-propylamino)di-n-butylsilane, bis(n- propylamino)diisobutylsilane, bis(n-propylamino)di-sec-butylsilane, bis(n-propylamino)di-t-butylsilane, bis(n-propylamino)di-n-neopentylsilane, bis(n-propylamino) dicyclopentylsilane, bis(n-propylamino)dicyclohexylsilane, bis(isopropylamino)dimethylsilane, bis(isopropylamino)diethylsilane, bis(isopropylamino)divinylsilane, bis(isopropylamino)di-n-propylsilane, bis(isopropylamino)diisopropylsilane, bis(isopropylamino)di-n-butylsilane, bis(isopropylamino)diisobutylsilane, bis(isopropylamino)di-sec-butylsilane, bis(isopropylamino)di-t-butylsilane, bis(isopropylamino)dineopentylsilane, bis(isopropylamino) dicyclopentylsilane, bis(isopropylamino) dicyclohexylsilane, or a combination of two or more thereof.

10. The process of claims 1 further comprising heating at a temperature sufficient to decompose the catalyst or remove an ammonia byproduct, an amine byproduct, or combination thereof.

11. The process of claim 1, wherein the polydiorganosiloxane is of the formula:

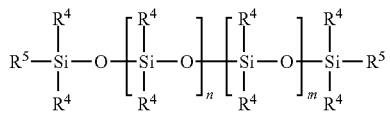

where each $R^4$ is independently selected from an alkyl, alkenyl, aromatic, arylalkyl, and fluoroalkyl, $R^5$ is —OH, and n+m is 50 or greater such that the polydiorganosiloxane has a viscosity of from about 500 cPs to about 200,000,000 cPs.

12. The process of claim 1, wherein the polydiorganosiloxane has a viscosity of from about 20,000 cPs to about 200,000,000 cPs.

13. The process of claim 1, wherein the polydiorganosiloxane has a viscosity of about 25,000 cPs to about 150,000,000 cPs.

14. The process of claim 1, wherein the polydiorganosiloxane comprises a mixture of two or more polydiorganosiloxanes.

15. The process of claim 14, wherein the mixture of two or more polydiorganosiloxanes comprises a first polydiorganosiloxane of a first viscosity of about 100,000 cPs to about 450,000 cPs, and a second viscosity of from about 300,000 cPs to about 750,000 cPs, where the second polydiorganosiloxane has a viscosity greater than that of the first polydiorganosiloxane.

16. The process of claim 1, wherein the MQ silicone resin has a density in the range of about 0.3 to about 0.9 g/cm³.

17. The process of claim 1, wherein the MQ silicone resin has a ratio of M units to Q units of from 0.2:1 to 1.7:1.

18. The process of claim 1, wherein the MQ resin comprises from about 2% to about 12% free Si—OH functional groups.

19. The process of claim 1 comprising exposing the reaction to nitrogen sparging.

20. The process of claim 1 wherein the reaction is conducted under vacuum for a period of time.

21. The process of claim 1 comprising dissolving the pressure sensitive adhesive in a non-aromatic solvent.

22. The process of claim 1, wherein the pressure sensitive adhesive produced from the process has a cyclic siloxane content of about 2000 ppm or less.

23. The process of claim 1, wherein the pressure sensitive adhesive produced from the process has an octamethylcyclotetrasiloxane content of about 2000 ppm or less; a decamethylcyclopentasiloxane content of about 2000 ppm or less; and/or a dodecamethylcyclohexasiloxane content of about 2000 ppm or less.

24. The process of claim 1, wherein the pressure sensitive adhesive produced from the process has an octamethylcyclotetrasiloxane content of about 1000 ppm or less; a decamethylcyclopentasiloxane content of about 1000 ppm or less; and/or a dodecamethylcyclohexasiloxane content of about 1000 ppm or less.

25. The process of claim 1, wherein the pressure sensitive adhesive produced from the process has an octamethylcyclotetrasiloxane content of about 500 ppm or less; a decamethylcyclopentasiloxane content of about 500 ppm or less; and/or a dodecamethylcyclohexasiloxane content of about 500 ppm or less.

26. The process of claim 1, wherein the pressure sensitive adhesive produced from the process has an octamethylcyclotetrasiloxane content of about 500 ppm or less; a decamethylcyclopentasiloxane content of about 500 ppm or less; and/or a dodecamethylcyclohexasiloxane content of about 500 ppm.

27. A process for producing a pressure sensitive adhesive comprising:
reacting at least one MQ silicone resin with at least one polydiorganosiloxane, wherein the MQ silicone resin is a solid, solventless resin, and the reaction is conducted in the absence of a solvent,
wherein the reaction is conducted in the presence of a catalyst, a chain extension agent, or combination thereof, and comprising at least one chain extension reagent selected from a silazane, a metal silanolate, a metal siloxalonate, a bis(alkylamino)dialkyl silane, a bis(alkylamino)dialkenyl silane, or combination of two or more thereof, wherein the silazane is selected from an alkyl or alkenyl substituted cyclosilazane having a ring size 6 or 8, a linear alkyl or polyalkyl substituted polysilazane, or a combination of two or more thereof.

28. A process for producing a pressure sensitive adhesive comprising:
reacting at least one MQ silicone resin with at least one polydiorganosiloxane, wherein the MQ silicone resin is a solid, solventless resin, and the reaction is conducted in the absence of a solvent,
wherein the reaction is conducted in the presence of a catalyst, a chain extension agent, or combination thereof, and comprising at least one chain extension reagent selected from a silazane, a metal silanolate, a metal siloxalonate, a bis(alkylamino)dialkyl silane, a bis(alkylamino)dialkenyl silane, or combination of two or more thereof, and
the process comprises heating at a temperature sufficient to decompose the catalyst or remove an ammonia byproduct, an amine byproduct, or combination thereof.

29. A process for producing a pressure sensitive adhesive comprising:
reacting at least one MQ silicone resin with at least one polydiorganosiloxane, wherein the MQ silicone resin is a solid, solventless resin, and the reaction is conducted in the absence of a solvent,
wherein the polydiorganosiloxane comprises a mixture of two or more polydiorganosiloxanes comprising a first polydiorganosiloxane of a first viscosity of about 100,000 cPs to about 450,000 cPs, and a second viscosity of from about 300,000 cPs to about 750,000 cPs, where the second polydiorganosiloxane has a viscosity greater than that of the first polydiorganosiloxane.

* * * * *